United States Patent [19]
Kondo

[11] Patent Number: 4,881,623
[45] Date of Patent: Nov. 21, 1989

[54] DISK BRAKE ASSEMBLY

[75] Inventor: Toshio Kondo, Okazaki, Japan

[73] Assignee: Aisin Seiki Kabushiki Kaisha, Kariya, Japan

[21] Appl. No.: 336,611

[22] Filed: Apr. 10, 1989

Related U.S. Application Data

[63] Continuation of Ser. No. 143,041, Jan. 12, 1988, abandoned.

[30] Foreign Application Priority Data

Jan. 12, 1987 [JP] Japan ................................ 62-002759

[51] Int. Cl.⁴ ............................................ F16D 65/40
[52] U.S. Cl. ............................ 188/73.38; 188/73.36; 192/30 W
[58] Field of Search ............... 188/73.35, 73.36, 73.37, 188/73.38, 205 A; 192/30 V

[56] References Cited

U.S. PATENT DOCUMENTS

| | | | |
|---|---|---|---|
| 3,638,765 | 2/1972 | Flaherty et al. | 188/73.38 |
| 3,887,044 | 6/1975 | Burgdorf et al. | 188/73.38 |
| 4,136,761 | 1/1979 | Burgdorf et al. | 188/73.36 X |
| 4,154,322 | 5/1979 | Yamamoto et al. | 188/73.37 |
| 4,155,430 | 5/1979 | Kawamura | 188/73.37 |
| 4,296,841 | 10/1981 | Fujimori et al. | 188/73.38 |
| 4,371,060 | 2/1983 | Iwata | 188/73.38 |
| 4,428,463 | 1/1984 | Burgdorf et al. | 188/73.38 |
| 4,467,897 | 8/1984 | Kubo et al. | 188/73.38 |
| 4,560,037 | 12/1985 | Gumkowski et al. | 188/73.38 |
| 4,609,077 | 9/1986 | Nakatsuhara | 188/73.38 |

FOREIGN PATENT DOCUMENTS

| | | | |
|---|---|---|---|
| 2354480 | 1/1978 | France | 188/73.36 |
| 2071238 | 9/1981 | United Kingdom | 188/73.38 |
| 2147673 | 5/1985 | United Kingdom | 188/73.36 |

Primary Examiner—George E. A. Halvose
Attorney, Agent, or Firm—Burns, Doane, Swecker & Mathis

[57] ABSTRACT

A disk brake assembly includes a rotary brake disk rotatable with a wheel and a mounting member fixed to a stationary member of a vehicle. A guide member is fixed at one end portion to the mounting member. A caliper member having a tubular portion slidably supported on the guide member is movable in an axial direction with the caliper member straddling a portion of the brake disk and having a fluid actuator provided with a piston on one side thereof to press an inner brake pad against one face of the brake disk and a reaction portion on the opposite side thereof to press an outer brake pad against the other face of the brake disk. The outer brake pad has a projection portion projected outwardly of the brake disk at the center of its backing plate and a spring member is disposed between the outer brake pad and the reaction portion and rigidly supported the outer brake pad on the caliper member. The spring member urges the outer brake pad outwardly of the brake disk and has a center clipping portion rigidly and elastically clipped to the projection portion. A pair of arm portions extend from both ends of the center clipping portion and engage with the reaction portion so as to decrease the diameter of the center clipping portion. A rising portion of the spring elastically engages with an outer surface of the reaction portion at the end of the arm portions.

3 Claims, 8 Drawing Sheets

DISK BRAKE ASSEMBLY

This application is a continuation of application Ser. No. 143,041, filed 1/12/88, now abandoned.

BACKGROUND OF THE INVENTION

1. Field of the Invention

The present invention relates to a disk brake assembly for wheeled vehicles, and more particularly to a disk brake assembly including an outer pad which is rigidly supported on a caliper member and which does not rattle or vibrate.

2. Description of the Prior Art

A conventional disk brake assembly is disclosed, for example, in Japanese application laid-open publication No. 58-118326 published on Aug. 12, 1983. This conventional disk brake assembly includes an outer pad having an outwardly projecting portion at its backing plate and a plate spring member for rigidly supporting the outer pad on a caliper member. The plate spring member is formed by press forming and includes a central annular portion having an engaging hole or opening and a pair of first spring arm portions extending from the central annular portion toward to the circumference of the brake disk and a second spring arm portion extending outwardly from the central annular portion to the radial direction of the brake disk. The engaging hole or opening of the central annular portion is provided with two engaging nail portions which are rigidly engaged with a projection portion of a backing plate of the outer pad, and the first spring arm portion engages with the two nail portions of the reaction portion of the caliper member at its end portions and urges the outer pad toward to the outer side of the brake disk. The second spring arm portion engages with the reaction portion of the caliper member at its end portion and urges the outer pad toward to the center of the brake disk.

In the above conventional disk brake assembly, however, since the outer pad is rigidly supported on the caliper member by means of the rigid snapping engagement of the engaging nail portions of the central annular portion of the plate spring member, it is necessary to strictly control the tolerances of the plate spring member during manufacture. Therefore, there is a drawback that manufacturing cost of the plate spring member is increased due to the above strict control of the tolerances during its manufacture and of the press forming process. Reuse of the plate spring member, after its installation and its removal is prevented by the transformation of the engaging nail portions of the central annular portion and wear of the projection portion of the outer pad. Therefore, proper performance of the plate spring member, for a period of extended use is less than desirable.

SUMMARY OF THE INVENTION

It is, therefore, an object of the present invention to improve the period of extended use of the spring which rigidly supports the outer pad on the caliper member.

It is another object of the present invention to reduce the manufacturing cost of the spring which rigidly supports the outer pad on the caliper member.

It is a further object of the present invention to improve the performance and removal of the spring which rigidly supports the outer pad on the caliper member.

It is a further object of the present invention to provide an improved disk brake assembly which includes a rotary brake disk rotatable with a wheel in a body including a mounting member fixed to a stationary member of a vehicle, a guide member positioned parallel with an axial direction of the brake disk and fixed at one end portion to the mounting member, a caliper member having a tubular portion slidably supported on the guide member to be movable in an axial direction. The caliper member straddles a portion of the brake disk and has a fluid actuator provided with a piston on one side thereof to press an inner brake pad against one face of the brake disk and a reaction portion on the opposite side thereof to press an outer brake pad against the other face of the brake disk by its two nail portions. The outer brake pad has a projection portion projected outward of the brake disk at the center of a backing plate between the two nail portions of the reaction portion of the caliper member. A spring member is positioned between the outer brake pad and the reaction portion of the caliper member and rigidly supports the outer brake pad on the caliper member. The spring member urges the outer brake pad outwardly of the brake disk and has a center clipping portion rigidly and elastically clipped to the projection portion of the outer brake pad and a pair of arm portions extend from both ends of the center clipping portion and engage with the nail portions of the reaction portion so as to decrease the diameter of the center clipping portion, respectively. A rising portion is elastically engaged with the outer surface of the nail portions of the reaction portion at the end of the arm portions, respectively.

BRIEF DESCRIPTION OF THE DRAWINGS

Additional objects and advantages of the present invention will become more apparent from the following detailed description of a preferred embodiment thereof when considered with reference to the attached drawings, in which.

DETAILED DESCRIPTION OF A PREFERRED EMBODIMENT

Figure 1:
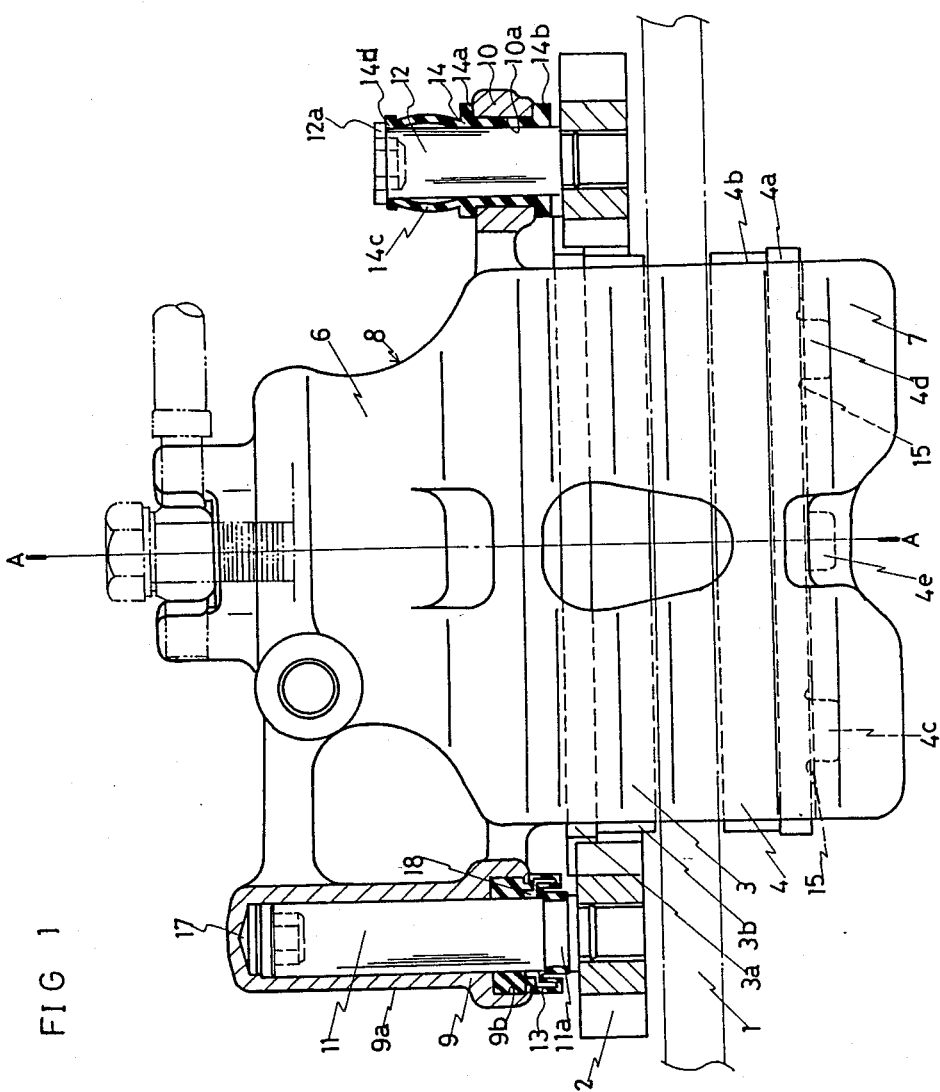
FIG. 1 is an elevation view partly in section of a disk brake assembly in accordance with the present invention.

A disk brake assembly in accordance with a preferred embodiment of the present invention will be described with reference of the drawings.

In FIGS. 1-9 of the appended drawings, there is illustrated a disk brake assembly of the pin slide type in accordance with the present invention which includes a rotary brake disk 1 secured for the rotation with a road wheel of an automotive vehicle. A mounting member 2 is fixed to a stationary member of a body structure of the vehicle such as a knuckle member (not shown) at the inside of the brake disk 1. An inner brake pad 3 is carried on the mounting member 2 at the inside of the brake disk 1. A member 8 straddles a portion of the brake disk 1. Parallel guide pins 11, 12 are fixed to the mounting member 2 to support thereon the caliper member 8, and an outer brake pad 4 is carried on the caliper member 8 at the outside of the brake disk 1.

Figure 6:
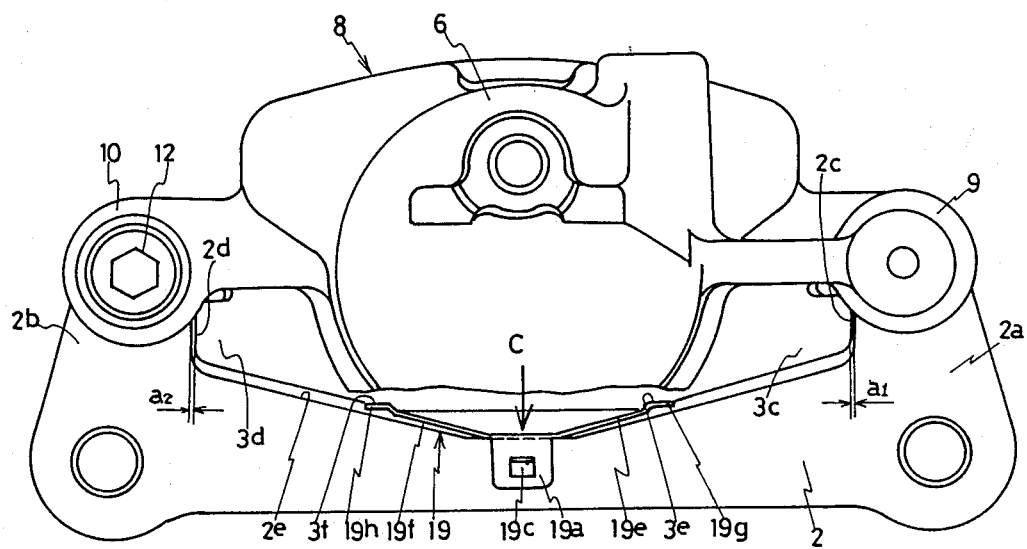
FIG. 6 is a side view of FIG. 1.
Figure 7:
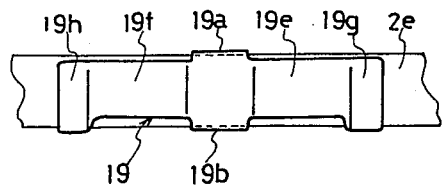
FIG. 7 is an elevation view of a C portion of FIG. 6.
Figure 8:
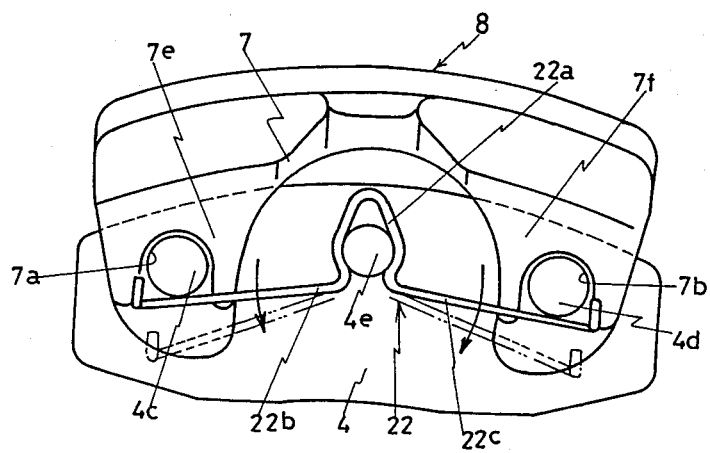
FIG. 8 and FIG. 9 are diagrams for explaining the present invention.
Figure 9:
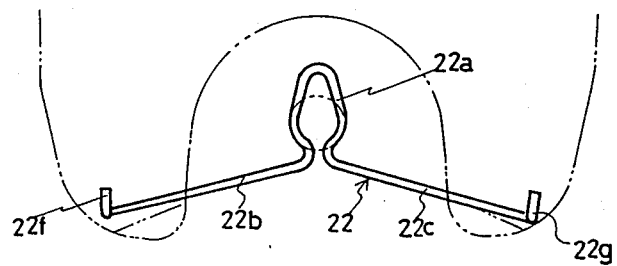

The mounting member 2 has a pair of arms 2a, 2b and is formed with a pair of recessed portions 2c, 2d wherein a pair of ear portions 3c, 3d of a backing plate 3a of the inner brake pad 3 is assembled so to be axially movable. The inner brake pad 3 is provided with an inner friction pad 3b secured to the backing plate 3a. The backing plate 3a is formed with a pair of dent or recess portions 3e, 3f which extend toward to an axial direction of brake disk 1 at its lower side surface and are located symmetrically with respect to the center line of inner brake pad 3 in a radial direction of the brake disk 1 as shown by FIG. 6.

In the center of the supporting surface 2e of the mounting member 2, a plate spring 19 is located and is provided with a first holding portion 19a and a second holding portion 19b which clips the mounting member 2 therein so as to prevent movement in forward and rearward directions of the vehicle by the guide portion 19c. The guide portion 19c is elastically fitted into a concave portion 2f. The plate spring 19 is further provided with a pair of arm portions 19e, 19f which extend in the forward and rearward directions of vehicle along the supporting surface 2e and are elastically contacted with the lower side surface of the backing plate 3a. Both arm portions 19e, 19f are formed with invex portions 19g, 19h which extend in an axial direction of the brake disk 1 at its end portion, respectively. The invex portions 19g, 19h are elastically fitted into the dent or recess portions 3e, 3f, respectively. According to this structure, the inner brake pad 3 is able to smoothly slide on the invex portions 19g, 19h and is positioned in the center of the supporting surface 2e of the mounting member 2 so as to provide equal clearances "a1", "a2" between the ear portions 3c, 3d and the recessed portions 2c, 2d as shown by FIG. 6. As a result, generation of hitting sounds and other noise between the ear portions 3c, 3d and the recessed portions 2c, 2d is prevented. As the invex portions 19g, 19h extend from the mounting member 2 toward the interior of the vehicle, they engage the dent or recess portions 3e, 3f with invex portions 19g, 19h before the inner brake pad 3 is mounted into the supporting surface 2e of the mounting member 2. Therefore, the exchange or replacement of the inner brake pad 3 can be easily and positively attained.

The caliper member 8 is formed by an Evaporative Pattern Casting Process and has a C-shaped cross-section for straddling the brake disk 1 and both the brake pads 3, 4 and has a cylinder body 6 and a reaction portion 7. The reaction portion 7 includes two nail portions which press the outer brake pad 4. The caliper member 8 is integrally formed at opposite ends thereof with tubular portions 9, 10 which are slidably supported on guide pins 11, 12 so as to be movable in an axial direction of brake disk 1. Within a cylindrical bore formed in the cylinder body 6, a cup-shaped piston 5 is axially slidably disposed through an annular sealing member 20 to press the inner brake pad 3 directly against one face of the brake disk 1. The annular sealing member 20 has a well-known retracting function of the piston 5 in response to release of pressurized fluid applied thereto. An annular elastic boot 21 encloses a sliding portion of the piston between the piston 5 and the cylinder body 6.

The tubular portion 9 is provided with a cylindrical bore 9a having a bottom portion which is slidably supported on the guide pin 11 fixedly threaded into the mounting member 2 at its one end portion to be movable in the axial direction of brake disk 1. The guide pin 11 is provided thereon with an elastic pin boot 13 which is arranged to protect the sliding portion between the guide pin 11 and the cylindrical bore 9a. The elastic pin boot 13 is fixedly engaged at one end with annular grooves 11a and at its other end with annular grooves 9b of the guide pin 11 and the tubular portion 9. The elastic pin boot 13 forms an airtight chamber 18 between both annular grooves 9b and 11a of the tubular portion and the guide pin 11, respectively. The airtight chamber 18 has the function of storing the grease which lubricates the sliding portion of the guide pin 11. The cylindrical bore 9a is provided with grooves (not shown) which extend from the bottom portion to the annular groove 11a. The grooves are formed at the same time when the caliper member is formed by the Evaporative Pattern Casting Process, and the grooves are formed at the free position on the guide pin 11 so as to avoid the position where the brake torque and the vibration load of the vehicles act. The elastic pin boot 13 is provided with grooves (not shown) at an inside surface of its other end, and the grooves are formed so as to slip with respect to the grooves of the cylindrical bore 9a. According to this structure, since an air chamber 17, formed between the bottom portion and the guide pin 11, is communicated with the airtight chamber 18 through both grooves, smooth and accurate assembly of the disk brake is permitted. Since a pressure difference between the air chamber 17 and the airtight chamber 18 is not created by both of the grooves, the caliper member 8 can smoothly slide on the guide pin 11 even when the caliper member 8 has to slide over an increased distance due to wear of the inner and outer friction pads.

The tubular portion 10 is provided with a penetrating bore 10a which is slidably supported on the guide pin 12 fixedly threaded into the mounting member 2 at its on end portion to be movable into the axial direction of the brake disk 1 through an elastic boot 14 and is provided with a flange portion 12a at its other end portion. The elastic boot 14 is fitted in the penetrating bore 10a so as to prevent movement in the axial direction of brake disk 1 due to its guide portions 14a, 14b. The elastic pin boot 14 is in the form of a hollow boot in which the guide pin 12 is fitted therein. The elastic boot 14 is provided with a sleeve portion 14c which extends from the guide portion 14a toward the inside of the brake disk 1 and which surrounds the guide pin 12 to protect the sliding portion of the guide pin 12. The sleeve portion 14c is in the form of a thin sleeve and is provided with a flange portion 14d which is contacted with the flange portion 12a of the guide pin 12 by its own elastic force at its end portion. According to this structure, since the capacity of an inside space of the sleeve portion 14c is not increased even when the caliper member 8 has to slide over increased distance when the inner and outer friction pads 3b, 4b wear, a negative pressure is not generated in the inside space of the sleeve portion 14c. As a result, the caliper member 8 can smoothly slide on the guide pin 12 without the generation of negative pressure in the inside space of the sleeve portion 14c, and it is able to protect the sliding portion of the guide pin 12. The compressed air in the inside space of the sleeve portion 14c is discharged from the contact surface between both flange portions 12a, 14d of the guide pin 12 and the elastic pin boot 14, respectively. The vibration of the capacity of the sleeve portion 14c is absorbed by elasticity of the sleeve portion 14c.

The outer brake pad 4 comprises the backing plate 4a and an outer friction pad 4b secured to the backing plate 4a. The outer brake pad 4 is pressed to the outer face of the brake disk 1 by the reaction portion 7. The backing plate 4a is provided with a pair of first projection portions 4c, 4d projected against the reaction portion 7. The reaction portion 7 is provided with a pair of holes 7a, 7b which the first projection portions 4c, 4d are fitted therein at its two nail portions 7e, 7f, respectively. According to this structure, the outer brake pad 4 is supported on the reaction portion 7 of the caliper member 8 by the first projection portions 4c, 4d. The outer backing plate 4a is further provided with a second projection portion 4e at the center between the first projection portions 4c, 4d so as to be located between the two nail portions of the reaction portion 7 toward to the outside of the brake disk 1. The first and the second projection portions 4c, 4d, 4e are shaped during manufacturing by press forming.

Figure 2:
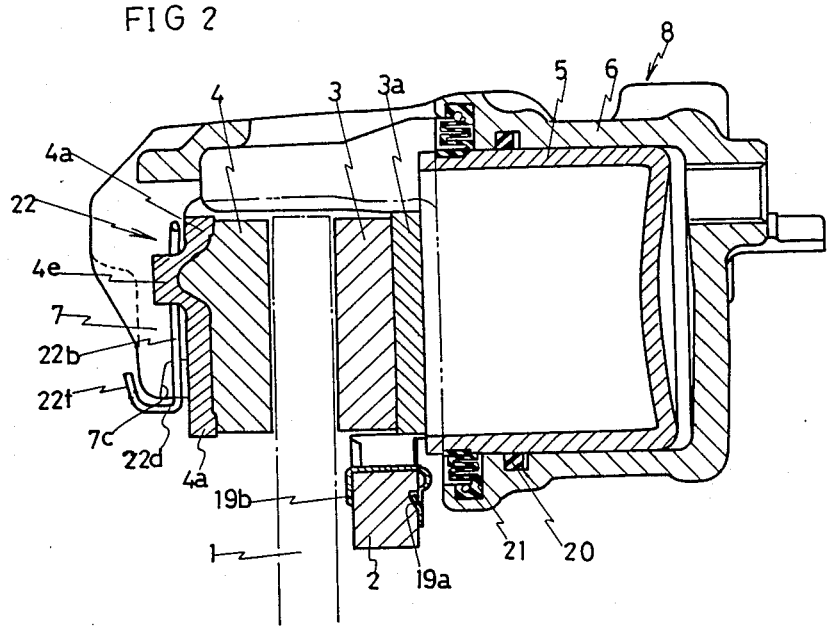
FIG. 2 is a sectional view taken substantially along the line A—A of FIG. 1.
Figure 3:
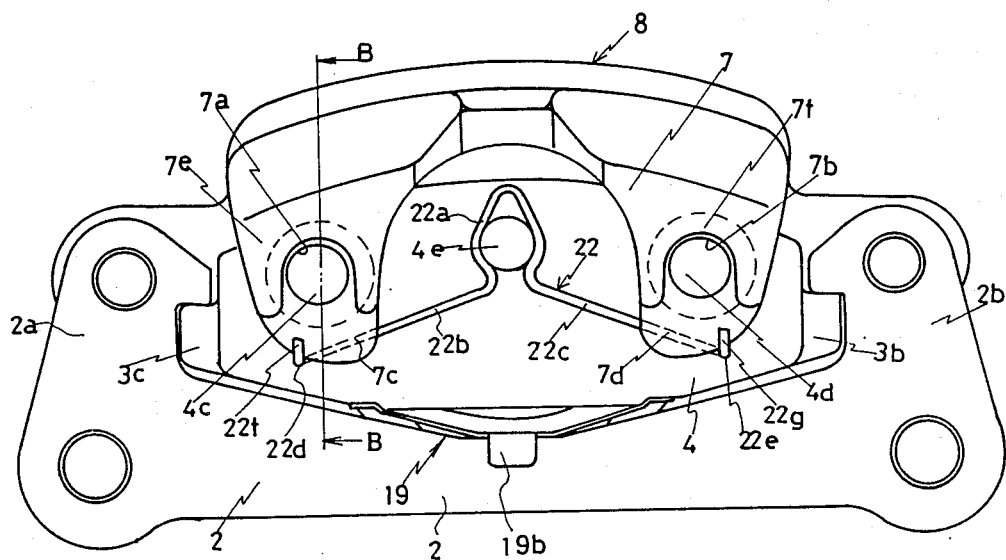
FIG. 3 is a side view of FIG. 1.
Figure 4:
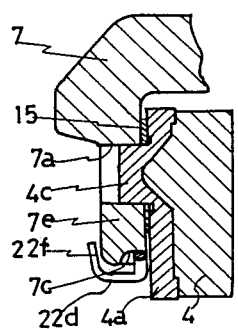
FIG. 4 is a sectional view taken substantially along the line B—B of FIG. 3.
Figure 5:
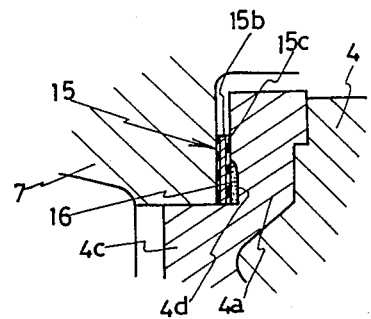
FIG. 5 is a partly enlarged sectional view of FIG. 4.

The outer brake pad 4 is urged toward the direction of an axial center of the outside of the brake disk 1 by a spring member 22 which is disposed between the second projection portion 4e and the two nail portions 7e, 7f of the reaction portion 7 and which rigidly supports the outer brake pad 4 on the reaction portion 7. The spring member 22 is provided with a center clipping portion 22a which is elastically clipped to the second projection portion 4e and has a diameter smaller than a diameter of the second projection portion 4e. The spring member 22 is further provided with two arm portions 22b, 22c which extend substantially coplanar from the center clipping portion 22a to concave portions 7c, 7d formed at the lower end portion of the inside of the two nail portions 7e, 7f of the reaction portion 7 and which are elastically engaged with the concave portions 7c, 7d so as to decrease the diameter of the center clipping portion 22a as shown by FIG. 2, FIG. 4, FIG. 8 and FIG. 9, respectively. The spring member 22 is further provided with two bending portions 22d, 22e which are engaged with the lower portion of the nail portions 7e, 7f of the reaction portion 7 as shown by FIG. 2 and FIG. 4, respectively, and further provided with rising portions 22f, 22g at the end of the bending portions 22d, 22e which are engaged with the lower portion of the outside of the two nail portions of the reaction portion 7. According to this structure, the spring member 22 urges the outer brake pad 4 outward of the brake disk 1 and urges the outer brake pad 4 toward to the center of the brake disk 1.

A shim 15 is interposed between the nail portions of the reaction portion 7 and the backing plate 4a or the outer brake pad 4, respectively, and the shim 15 is provided with a hole or opening 15a which is rotatably fitted on the first projection portions 4c, 4d, respectively. The shim 15 consists of a steel plate 15b and a vibration-proof material 15c, such as rubber, which covers the steel plate 15b. An annular groove 4f surrounds the first projection portion 4c formed at the base portion of the first projection portions 4c, 4d, respectively, and the annular grooves 4f has a width in the radial direction smaller than a width of the shim 15 in the radial direction. A grease or lubricant 16 is filled in the annular grooves 4f so as to decrease the friction resistance between the shim 15 and the backing plate 4a.

When a fluid pressure from the master cylinder (not shown) is applied to the cylinder body 6 of the caliper member 8, the piston 5 slides and presses the inner brake pad 3 to one face of the brake disk 1. At the same time, the caliper member 8 slides on the guide pins 11, 12 at the tubular portions 9, 10 toward to the inside of the vehicle and the reaction portion 7 presses the outer brake pad 4 to the other face of the brake disk 1.

In the prior art, a minute vibration of the outer brake pad 4 in the axial direction and in the direction of the rotation of the brake disk 1 is caused by the frictional resistance between the brake disk 1 and the outer friction pad 4b. In the present invention, however, the minute vibration of the outer brake pad 4 in the direction of the rotation of the brake disk 1 does not permit a stick-slip occurrence between the outer brake pad 4 and the reaction portion 7 by the grease or lubricant 16 in the annular grooves 4f. The minute vibration of the outer brake pad 4 is communicated in an axial direction of the brake disk 1 with the reaction portion 7 by the shim 15 and the grease or lubricant 16. The vibration-proof material 15c of the shim 15 and the grease or lubricant 16 absorb the minute vibration of the outer brake pad 4 in the axial direction of the brake disk 1. As mentioned above, the generation of an uncomfortable squeak noise, termed a "disk brake-echo" phenomenon is prevented. In the present invention, the position slip of the shim 15 with respect to the outer brake pad 4 is totally prevented by the first projection portions 4c, 4d. Further, the shim 15 according to present invention is pressed by the nail portions 7e, 7f of the reaction portion 7 along all its surfaces. Therefore, the separation of the vibration-proof material is prevented and the shim is subjected to less wear.

According to the present invention, the same shim may be used on either of the left and right wheels. Furthermore, it is possible to position the shim 15 in only on of the first projection portions, therefore it is able to prevent the biasing wear of the friction pad.

Also according to the present invention, since the outer brake pad 4 is rigidly supported on the reaction portion 7 of the caliper member 8 by the spring member 22 and the spring member 22 urges the outer brake pad 4 toward to the center of the brake disk 1, a play of the outer brake pad 4 in the radial direction of the brake disk 1 is prevented by the spring member 22 which prevents the condition in which the outer friction pad 4b of the outer brake pad 4 is contacted by the other face of the brake disk 1. Further, rattle of the outer brake pad 4 caused by vibration of the wheels is prevented. When the brake pads 3, 4 are changed, the guide pin 12 is removed from the mounting member 2 and the caliper member 8 is rotated about the guide pin 11 with the outer brake pad 4. At this time, the outer brake pad 4 is not dropped from the caliper member 8 by the spring member 22. Since installation and removal of the spring member 22 can be performed without difficulty by means of the addition of a load to the arm portions 22b, 22c provided in a direction toward each other, the spring member 22 has an improved durability which permits reuse and which improves the performance of the installation and the removal of the spring member 22. The engaging force of the center clipping portion 22a with respect to the second projection portion 4e is reinforced by the engagement between the arm portion 22b, 22c and the concave portions 7c, 7d of the nail portions 7e, 7f of the reaction portion 7 or the bending portions 22d, 22e and the nail portions 7e, 7f of the reaction portion 7. Due to this arrangement, the spring member 22 is not required to be manufactured with the exacting tolerance of the prior art. This permits its manufacturing cost to be reduced.

Although certain specific embodiments of the present invention have been shown and described, it is obvious that many modifications thereof are possible. The present invention, therefore, is not intended to be restricted to exact showing of the drawings and description thereof, but is considered to include reasonable and obvious equivalents.

What is claimed is:

1. A disk brake assembly comprising:

a rotary brake disk rotatable with a wheel in a body;

a mounting member fixed to a stationary member of a vehicle;

a guide member positioned parallel with respect to an axial direction of said brake disk and fixed at one end portion to said mounting member;

a caliper member having a tubular portion slidably supported on said guide member to be movable in an axial direction, said caliper member straddling a portion of said brake disk and having a fluid actuator provided with a piston on one side thereof to press an inner brake pad against one face of said brake disk and a reaction portion on an opposite side thereof to press an outer brake pad against an opposite face of said brake disk;

said outer brake pad having a projection portion projected axially outwardly of said brake disk at a center of its backing plate between nail portions of said reaction portion of said caliper member;

a spring member disposed between said outer brake pad and said reaction portion of said caliper member and rigidly supporting said outer brake pad on said caliper member; and said spring member urging said outer brake pad axially outwardly of said brake disk and having a center clipping portion rigidly and elastically clipped to said projection portion of said outer brake pad and having a pair of arm portions extending from said center clipping portion, said arm portions and said center clipping portion being substantially coplanar and said arm portions being engaged with inclined concave portions on an axially inner surface of said nail portions of said reaction portion of said caliper member, said arm portions having end portions elastically engaged with an axially outer surface of said nail portions of said reaction portion at ends of said arm portions, said center clipping portion having a diameter that is decreased as a result of the force produced by the elastic engagement of the end portions of the spring member with the axially outer surface of said nail portions, said spring member urging said outer brake pad toward a center section of said brake disk and substantially equalizing an elastic force operating on the outer brake pad.

2. A disk brake assembly as recited in claim 1, wherein said concave portions are located at a lower end portion of said nails pressing surface and said arm portions of said spring member are elastically engaged with said concave portion of said nail portions.

3. A disk brake assembly as recited in claim 1 wherein said backing plate of said outer brake pad is provided with two additional projection portions which project against said nail portions of said reaction portion, said nail portions of said reaction portion being provided with a pair of holes which receive said additional projection portions.

* * * * *